Figure 1:
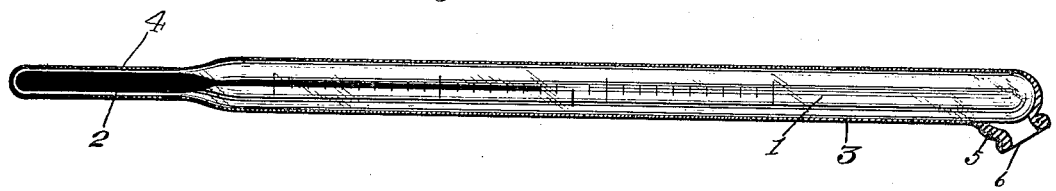

D. H. MILLS.
THERMOMETER COVER.
APPLICATION FILED SEPT. 19, 1919.

1,363,259.  Patented Dec. 28, 1920.

WITNESSES
E. A. Buchanan.
C. E. Trainor

D. H. Mills, INVENTOR

BY
ATTORNEYS

UNITED STATES PATENT OFFICE.

DAVID HIRST MILLS, OF ONEONTA, NEW YORK.

THERMOMETER-COVER.

1,363,259.  Specification of Letters Patent.  Patented Dec. 28, 1920.

Application filed September 19, 1919. Serial No. 324,838.

*To all whom it may concern:*

Be it known that I, DAVID H. MILLS, a citizen of the United States, and a resident of Oneonta, in the county of Otsego and State of New York, have invented certain new and useful Improvements in Thermometer-Covers, of which the following is a specification.

My invention is an improvement in thermometer covers, and has for its object to provide a cover of flexible elastic material that may be used during the use of the thermometer to avoid the necessity of washing, drying and the like after use, to prevent the swallowing of broken glass or mercury in case of breakage of the thermometer in the mouth or rectum of the user, to provide an absolutely sterile or aseptic way of taking temperatures and to prevent the transmission of infectious and contagious diseases.

Figure 2:
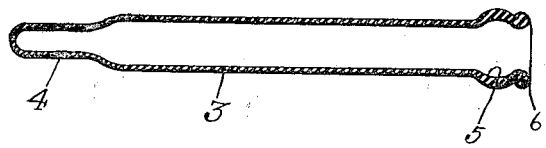

In the drawings:

Figure 1 is a sectional view of the cover in place on a clinical thermometer; and Fig. 2 is a sectional view of the cover removed.

The present embodiment of the invention is shown in combination with a clinical thermometer of usual construction comprising a body portion 1 and a bulb 2. The cover 3, which is of rubber or other like elastic material, is a tubular casing having one end open, and having the other end reduced, as shown at 4, to fit the bulb. The body 3 of the casing fits the body 1.

The cover is of a length approximately half that of the thermometer, and at the open end the cover is slightly thickened, as shown, and is provided with an annular internal groove 5 at the thickened portion, forming an exterior annular rib. Beyond the rib the open end of the thermometer is beaded, as indicated at 6, to facilitate the insertion of the thermometer.

In use, the covers, which may be marketed in sterile containers to be opened when used, are placed upon the thermometer by inserting the bulb end of the thermometer in the open end of the cover. The annular rib provides a hand-hold for stretching the cover over the thermometer and when the rib is arranged as shown in Fig. 1, slightly lateral to the thermometer end, the cover cannot retract, the rib holding it over the large end of the thermometer. After use, the rubber is removed and may be thrown away or re-sterilized, as may be found desirable, it being understood that a new or thoroughly sterilized cover is provided at each use of the thermometer.

In case of breakage there is no danger of swallowing mercury or broken glass or cutting the mouth with broken glass.

The cover at the bulb is of such thickness that it does not interfere with the transmission of the body heat to the mercury in the bulb.

I claim:

A tubular clinical thermometer cover of rubber or the like, shaped to fit and normally of less length than the thermometer and adapted to be stretched over the thermometer, one end of the cover being open for admitting the thermometer and the other end being closed, the open end portion having means to be engaged and retained over that end of the thermometer remote from the bulb to prevent retraction of the cover, said means comprising an annular enlargement of the cover near the open end.

DAVID HIRST MILLS.